A. J. SEAMAN.
TIRE VALVE.
APPLICATION FILED APR. 10, 1913.

1,115,252.

Patented Oct. 27, 1914.

Witnesses:
L. B. Weymouth.
E. C. Murphy.

Inventor:
Albert J. Seaman
By Henry J. Miller
atty.

UNITED STATES PATENT OFFICE.

ALBERT J. SEAMAN, OF BOSTON, MASSACHUSETTS, ASSIGNOR TO ALBERT J. GREENE, OF BOSTON, MASSACHUSETTS.

TIRE-VALVE.

1,115,252.

Specification of Letters Patent. Patented Oct. 27, 1914.

Application filed April 10, 1913. Serial No. 760,174.

*To all whom it may concern:*

Be it known that I, ALBERT J. SEAMAN, of Boston, in the county of Suffolk and State of Massachusetts, have invented certain new and useful Improvements in Tire-Valves, of which the following is a specification, reference being had to the accompanying drawings, forming part thereof.

This invention has reference to improvements in valves for the pneumatic tubes of wheel tires and for similar purposes.

One object of the invention is to so construct a pneumatic valve comprising a casing that said casing and the operative parts of the valve therewith may be detachably secured to the usual air inlet pipe with which the air tube of a pneumatically inflated tire is usually supplied so that such valve casing and its related parts may be removed from said air inlet pipe as a complete article.

Another object of the invention is to so construct a valve of this general nature that its relatively movable parts may be guided and controlled in an improved manner.

Other objects of the invention will appear from the following description.

The invention consists in the novel construction of the valve stem and in the means, in fixed relation to such valve stem for holding the valve actuating spring under compression.

The invention also consists in such other novel features of construction and combination of parts as shall hereinafter be more fully described and pointed out in the claim.

Figure 1:
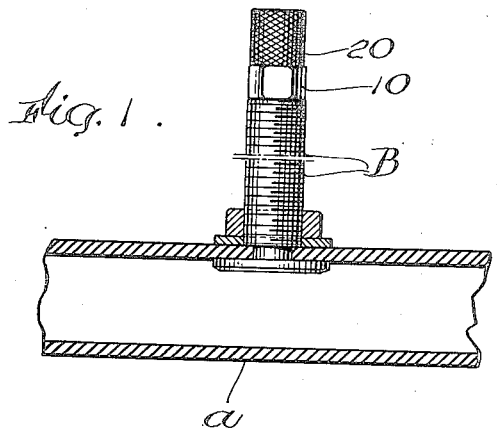
Figure 2:
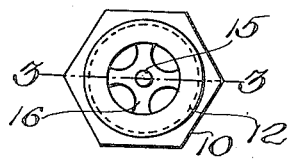
Figure 5:
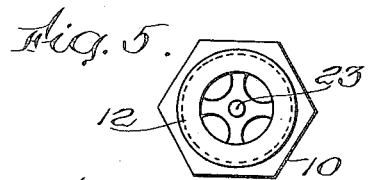
Figure 3:
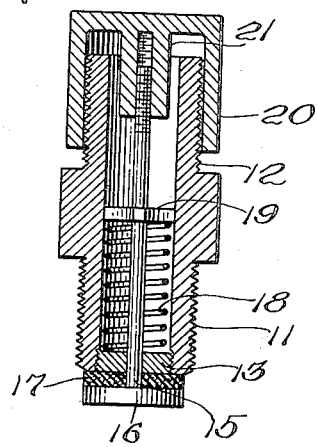
Figure 8:
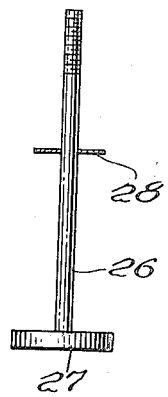
Figure 6:
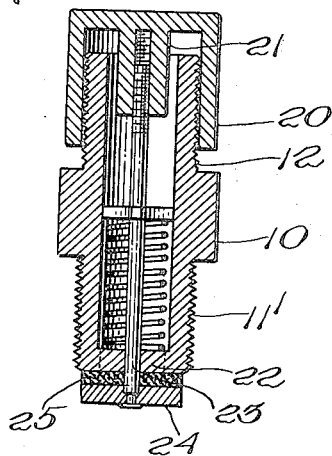
Figure 4:
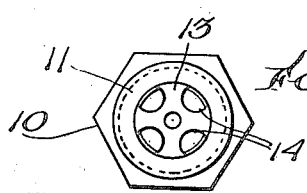
Figure 7:
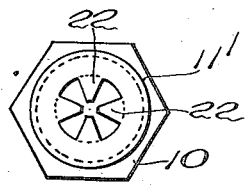

Figure 1, represents the improved valve in elevation attached to the usual air inlet pipe of an ordinary pneumatic tire tube, parts of which are shown. Fig. 2, represents a plan view of the valve casing, with the cap removed. Fig. 3, represents a sectional view of the complete valve as taken on a line 3—3 of Fig. 2. Fig. 4, represents a bottom plan view of the valve casing with the valve removed. Fig. 5, represents a plan view similar to Fig. 2 relating to a modified construction of the valve of which Fig. 6, represents a vertical diametrical sectional view of Fig. 7, and Fig. 7, represents a bottom plan view thereof. Fig. 8, represents a side elevation of the valve and its stem furnished with a different device for holding the valve spring under compression.

Similar characters of reference designate corresponding parts throughout.

As shown in the drawings the essential feature of this invention is the valve comprising a casing and related parts forming in themselves a complete article and including a spring actuated valve stem having or provided with means fixedly mounted on or formed in part with said stem to hold the valve actuating spring under compression.

As shown in the drawings *a* represents portions of the tire tube or other air chamber to which air is to be supplied and B the usual air inlet tube or pipe fixed to said tire tube or chamber and, in this case, said tube B having an inner screw thread. The casing 10 of this improved valve, see Figs. 1 and 3, has a cross sectional shape adapted to be engaged by a wrench or similar tool and the cylindrical end members 11 and 12 of said casing 10 are of less diameter than the main middle portion and the nipple member 11 has an external screw thread adapted to be received by the inner screw thread of the tire pipe B until the middle enlargement 10 seats itself against the end of said pipe B, while nipple 12 is screw threaded to receive the usual connection of any ordinary air supply pipe. In said Fig. 3 it will be seen that the lower end of the nipple member 11 has the plug member 13 screwed therein. This member 13 has the air passages 14, 14, and a central bore in which the valve stem 15 is slidable. The valve stem 15 has the integral valve 16 exterior to the plug member 13 and furnished with the rubber packing 17 adapted to close against said plug member 13 and, at its upper end the valve stem 15 is screw threaded. Within the casing 10 is located the coil spring 18 which rests on the plug member 13 and is held under compression by the spider member 19 whereby the action of said spring 18 tends constantly to hold the packing 17 and valve 16 in the closed position. Cap 20 is adapted positively to hold the valve 16 in the closed position at times and for such purpose this cap 20 has the internally screw threaded socket 21 of a diameter to be received in the bore of the valve casing and having its screw thread engaged with the thread of valve stem 16 whereby said cap 20 may be screwed onto said valve stem until the cap bears against the end of nipple member 12 after which the continued rotation of said cap will draw the stem 15 and its valve 16 in a direction to positively hold the packing 17 against the end of member 11 to close the air passages 14, 14. As spider member 19 is fixed on said valve stem 15 the parts are assembled by first passing said valve stem through the bore of plug member 13, then placing spring 18 over said stem 15 and against said plug member and then forcing the spider member 19 on to valve stem to hold spring 18 under compression whereby, as the bore of said spider member is smaller than the valve stem 15 a close frictional engagement of these parts is effected. After such assemblage of the parts referred to the valve stem 15 with the spring 18 and its spider 19 are introduced into the open end of nipple member 11 until plug member 13 comes into engagement with the inner screw thread of said nipple member when said plug member 13 is screwed into said nipple member. The cap 20 is now screwed onto the valve stem 15, as is shown in said Fig. 3 and may be screwed to position to draw valve stem 15 positively in the closing direction.

In Figs. 5, 6 and 7 is shown a modification of the invention relating more particularly to the valve casing in which the nipple member 11' of said casing has formed in part therewith the inwardly extending segmental arms 22, 22 the inner ends of which form a guide for the valve stem 23 having fixed to its outer end the valve 24 furnished with the rubber packing 25. In assembling this modified form the valve 24 with its packing is secured to the end of stem 23 which stem is then passed endwise through the axial guide between the ends of arms 22, 22. The spring 18 is now placed in the bore of the valve casing and rests on the arms 22 and the bore of spider 19 is now engaged with the screw threaded end of valve stem 15 and is forced downward by means of a suitable tool adapted to enter the bore of the valve casing, until said spider compresses said spring somewhat so that said spring tends constantly to hold said valve stem and its valve in the closed position.

In the modification shown in Fig. 8 is disclosed a valve stem having a fixed member for holding the valve actuating spring under compression. In this construction the valve stem 26 has a transverse slot located at a suitable distance from its valve 27 and in said slot is mounted the transversely extend-
ing spring 28 which may be inserted through the spaces between the arms 22, 22 of the structure shown in Fig. 6, while the stem 26 is slidably engaged with the inner ends of said arms. When said valve stem 26 is thus in place in the valve casing a coil spring 18 is inserted into said casing through the nipple end 12 and is forced downward against the free ends of said yielding spring holding member 28 which free ends yield and permit the passage of said spring 18 but, after such passage, spring to position to engage and hold said spring 18 under compression. This may be accomplished as the pressure exerted by spring 18 is comparatively slight and is not sufficient to effect the bending of the spring member 28 to a point at which spring 18 can slip over said member.

The operation of this valve will readily be understood by reference to the drawings. First cap 20 is removed and an air supply pipe is attached to nipple member 12. The inflowing air passes between the arms of the spider and through the air passages in the valved end of the casing and the pressure of such air is of course sufficient to press the valve away from the end of the valve casing against the action of the valve actuating spring. When the pressure of the inflowing air is sufficiently reduced the valve spring acts to move the valve to the closed position. The air supply pipe is now removed from nipple member 12 and cap 20 is replaced and screwed on to the valve stem to draw and hold said stem positively in the closed position in which the valve will hold its packing against the end of the valve casing.

It is not my intention to limit my invention in any way to a specific construction as regards the manner of mounting the valve and the spring holding device on the valve stem as it is immaterial to the successful operation of the valve whether the valve be integral with the valve stem or secured to such stem. The sole limitation as to these parts is that the spider or device for holding the valve actuating spring under compression is in fixed relation to the valve stem and by the expression "fixed relation" I mean such that said spider or device is so fixed, secured or mounted on the valve stem that neither the rotation of said stem nor the vibration of the valve actuating spring can effect a relative movement between said spider or device and the valve stem.

Having thus described my invention I claim as new and desire to secure by Letters Patent:

A tire valve of the nature described comprising a casing having at one end a valve seat furnished with a central guide and air passages, a valve stem slidable in said guide and having an exterior integral valve and a screw threaded inner end, a spider fixed to said valve stem, a spring located within said casing and acting against said spider to close said valve, and a cap having a wall to embrace said casing and an axial screw threaded socket engaged with said valve stem whereby said valve stem can be drawn in a direction to positively hold said valve in the closed position.

ALBERT J. SEAMAN.

Witnesses:
FRED O. WELSH,
EDGAR P. LARKIN.